United States Patent
Pyo

(10) Patent No.: US 9,690,758 B2
(45) Date of Patent: Jun. 27, 2017

(54) METHOD AND SYSTEM FOR SUPPORTING AN ELECTRONIC BOOK APPLICATION SERVICE, AND MOBILE DEVICE ADAPTED TO THE METHOD

(75) Inventor: Jong Sun Pyo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1328 days.

(21) Appl. No.: 13/303,499

(22) Filed: Nov. 23, 2011

(65) Prior Publication Data
US 2012/0137246 A1    May 31, 2012

(30) Foreign Application Priority Data

Nov. 25, 2010  (KR) .................. 10-2010-0117933

(51) Int. Cl.
G06F 3/048 (2013.01)
G06F 17/22 (2006.01)
G01C 21/36 (2006.01)

(52) U.S. Cl.
CPC ....... G06F 17/2235 (2013.01); G01C 21/362 (2013.01)

(58) Field of Classification Search
CPC .......... G06F 15/0291; G06F 17/30017; G06F 17/30241
See application file for complete search history.

(56) References Cited

U.S. PATENT DOCUMENTS

| 2002/0002467 A1* | 1/2002 | Ho .................. G01C 21/3644 705/323 |
| 2009/0279842 A1 | 11/2009 | Liao et al. |
| 2010/0023257 A1 | 1/2010 | Machino |

FOREIGN PATENT DOCUMENTS

| KR | 10-0966797 B1 | 6/2010 |
| KR | 10-2010-0111157 A | 10/2010 |
| KR | 10-1289378 B1 | 7/2013 |
| WO | 2008/072412 A1 | 6/2008 |

* cited by examiner

Primary Examiner — Jeffrey A Gaffin
Assistant Examiner — Ayesha Huertas Torres
(74) Attorney, Agent, or Firm — Jefferson IP Law, LLP

(57) ABSTRACT

A method and system for supporting an electronic book (e-book) application service and a mobile device adapted to the method are provided. The method includes reproducing an e-book stored in a storage unit, creating, when a number of words related to place names are selected in the e-book, e-book auxiliary content that includes information regarding a map to which information regarding routes between locations corresponding to the selected words is applied, with respect to at least one page containing the selected words, and storing the e-book with the e-book auxiliary content in the storage unit.

20 Claims, 11 Drawing Sheets

```
mon.ncx
<navMap>
    <mapPoint id = "2587192f0s-0fs1-f0000f"  playOrder= "1" >
        <mapLabel>
            <text> Paris </text>
            <pageNum src= "chapter1.html#32.19%" />
            <location> +48.856667, -2.350987 </location>
        </mapLabel>
    </mapPoint>
    <mapPoint id = "2587192f0s-0fs1-f0000f"  playOrder= "2" >
        <mapLabel>
            <text> London </text>
            <pageNum src= "chapter2.html#18.33%" />
            <location> +0.8563327, +2.350987 </location>
        </mapLabel>
    </mapPoint>
    ...
</navMap>
```

METHOD AND SYSTEM FOR SUPPORTING AN ELECTRONIC BOOK APPLICATION SERVICE, AND MOBILE DEVICE ADAPTED TO THE METHOD

PRIORITY

This application claims the benefit under 35 U.S.C. §119(a) of a Korean patent application filed on Nov. 25, 2010 in the Korean Intellectual Property Office and assigned Serial No. 10-2010-0117933, the entire disclosure of which is hereby incorporated by reference.

BACKGROUND OF THE INVENTION

1. Field of the Invention

The present invention relates to electronic book (e-book) application services. More particularly, the present invention provides a method and system that reproduce an e-book, create, according to a user's input, new contents that supplement the e-book, and allow users to easily understand the e-book contents. The present invention also provides a mobile device adapted to the method.

2. Description of the Related Art

Mobile devices are widely used because they can be easily carried and also provide a variety of functions. Mobile devices typically include particular modules to support various types of functions. For example, mobile devices include audio player modules for playing back audio files, camera modules for acquiring videos, etc. Recently, mobile devices have been developed to provide an electronic book (e-book) service.

The term "electronic books" (e-books) refers to digital books that contain information such as text, images, etc., and are stored in electronic media, and which can be read similarly to paper books. E-books are created from digital data that may be converted from content in paper books or publications and then stored in electronic media, so that users can view the contents of an e-book, via computers or mobile devices, via wired or wireless communication. Since e-books simply provide text, images, illustrations, etc., users must memorize most parts of a story in corresponding e-book content in order to figure out the development or flow of the story. In particular, when users lose part of a story although they had read the story via the e-book, they have difficulty thinking about which e-book they read. In that case, the users might need to open a number of e-books and read part of the e-books until they recall the corresponding e-book. When they seek a corresponding e-book, they must also re-read the parts that they had already read in order to detect the particular information regarding, or the development of, the story. Therefore, a system and method are required that assist users to recall an e-book while they are opening the e-book, to easily acquire corresponding information, and share the information.

SUMMARY OF THE INVENTION

Aspects of the present invention are to address at least the above-mentioned problems and/or disadvantages and to provide at least the advantages described below. Accordingly, an aspect of the present invention is to provide a method and system that can re-produce and operate auxiliary content that the user wants, to supplement an electronic book (e-book). The present invention further provides a mobile device adapted to the method.

In accordance with an aspect of the present invention, a method for supporting an e-book application service is provided. The method includes reproducing an e-book stored in a storage unit, creating, when a number of words related to place names are selected in the e-book, e-book auxiliary content that includes information regarding a map to which information regarding routes between locations corresponding to the selected words is applied, with respect to at least one page containing the selected words, and storing the e-book with the e-book auxiliary content in the storage unit.

In accordance with another aspect of the present invention, a system for supporting an e-book application service is provided. The system includes at least one mobile device for creating, when a number of words related to place names are selected in a reproduced e-book, e-book auxiliary content that includes information regarding a map to which information regarding routes between locations corresponding to the selected words is applied, with respect to at least one page containing the selected words, and for storing the e-book with the e-book auxiliary content, and a content providing server for receiving and storing the e-book auxiliary content transmitted from the mobile device or for providing stored e-book auxiliary content to the mobile device.

In accordance with another aspect of the present invention, a mobile device is provided. The mobile device includes a controller for creating, when a number of words related to place names are selected in a reproduced e-book, e-book auxiliary content that includes information regarding a map to which information regarding routes between locations corresponding to the selected words is applied, with respect to at least one page containing the selected words, and a storage unit for storing the e-book with the e-book auxiliary content.

Other aspects, advantages, and salient features of the present invention will become apparent to those skilled in the art from the following detailed description, which, taken in conjunction with the annexed drawings, discloses exemplary embodiments of the present invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
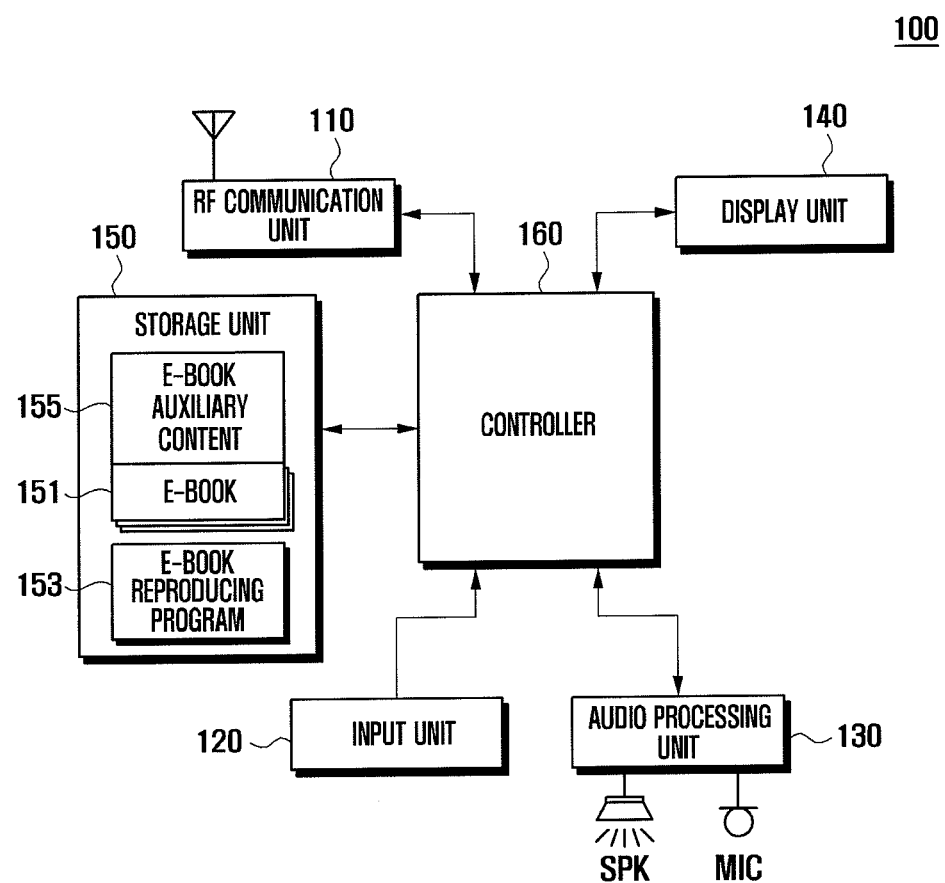
FIG. 1 illustrates a schematic block diagram showing a configuration of a mobile device for supporting an electronic book (e-book) application service according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the present invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present invention. Accordingly, it should be apparent to those skilled in the art that the following description of exemplary embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining the exemplary embodiments of the present invention, terminologies will be defined for the present description below. The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the exemplary embodiments disclosed in the description and configurations illustrated in the drawings are only exemplary embodiments, instead there may be various modifications, alterations, and equivalents thereof to replace the exemplary embodiments at the time of filing this application.

FIG. 1 illustrates a schematic block diagram showing a configuration of a mobile device for supporting an e-book application service according to an exemplary embodiment of the present invention.

Referring to FIG. 1, a mobile device 100 includes a Radio Frequency (RF) communication unit 110, an input unit 120, an audio processing unit 130, a display unit 140, a storage unit 150, and a controller 160.

The mobile device 100 can reproduce an electronic book (e-book) 151 stored in the storage unit 150, create e-book auxiliary content 155 based on the e-book 151 according to a user's request during reproduction of the e-book, and include or link the created e-book auxiliary content 155 in or to the e-book 151, thereby allowing the user to open the e-book in a specialized mode. In the following description, the components of the mobile device 100 are explained in detail.

The RF communication unit 110 establishes communication channels with a base station to perform data communication and voice calls with other mobile devices. The RF communication unit 110 includes (not shown) an RF transmitter for up-converting a frequency of signals to be transmitted and amplifying the signals and an RF receiver for low-noise amplifying received RF signals and down-converting a frequency of the received RF signals. In an exemplary embodiment of the present invention, the RF communication unit 110 establishes a communication channel with a server or another mobile device 100, and then receives an e-book 151 therefrom according to the user's request. The RF communication unit 110 transmits the e-book auxiliary content 155 to a server or another mobile device 100 or receives e-book auxiliary content from a server or another mobile device 100 according to the control of the controller 160. It will be noted that the mobile device 100 according to exemplary embodiments of the present invention is not limited thereto and may be implemented without the RF communication unit 110 if it does not support a communication function.

The input unit 120 includes input keys and function keys that allow the user to input numbers or letter information and to set a variety of functions. The function keys may include direction keys, side keys, shortcut keys, etc., which are set to perform specific functions. The input unit 120 creates key signals for setting user's options and for controlling functions of the mobile device 100, and transmits them to the controller 160. In an exemplary embodiment of the present invention, the input unit 120 can create a variety of input signals according to the user's request, and transfer them to the controller 160. Examples of the input signals are: a signal for reproducing an e-book stored in the storage unit 150; a signal for selecting a particular work to create e-book auxiliary content 155 during the e-book reproduction; a signal for selecting one of the items included in the e-book auxiliary content 155; a signal for accessing a server that provides e-book auxiliary content; a signal for downloading particular e-book auxiliary content from a corresponding server; etc.

The audio processing unit 130 outputs, via a speaker (SPK), audio signals that are received via the RF communication unit 110 or created when audio files stored in the storage unit 150 are reproduced, according to the control of the controller 160. The audio processing unit 130 also receives audio signals such as voices via a microphone (MIC) and transmits them via RF communication unit 110. In an exemplary embodiment of the present invention, the audio processing unit 130 outputs, via the speaker (SPK), audio signals created when an e-book 151 stored in the storage unit 150 is reproduced. The audio processing unit 130 also outputs, via the speaker, guide voices created when e-book auxiliary content 155 is reproduced. It should be understood that the outputting of audio signals according to the reproduction of e-book and e-book auxiliary content may be omitted according to a user's settings.

The display unit 140 includes a display panel (not shown). The display unit 140 displays, via the display panel, menus of the mobile device 100, data input by the user, function information set by the user, information provided to the user, etc. When the display unit 140 further includes a touch panel arranged on the display panel, it can also serve to perform a touch screen function. In that case, the display unit 140 can also serve as an input device and create input signals based on the touch panel. The display unit 140 may be implemented with flat display devices with thin film transistors, for example, a Liquid Crystal Display (LCD), an Organic Light Emitting Diode (OLED), etc. In an exemplary embodiment of the present invention, the display unit 140 displays screens when an e-book 151 and e-book auxiliary content 155 are reproduced. The screens of reproducing e-book and e-book auxiliary content will be described in detail later referring to the accompanying drawings.

The storage unit 150 stores application programs for executing functions of the mobile device 100. The storage unit 150 also stores data transferred from the input unit 120, data transmitted from the other mobile devices, videos acquired via a camera of the mobile device 100, etc. The storage unit 150 comprises a program storage area and a data storage area (not shown).

The program storage area stores an Operating System (OS) for controlling the entire operation of the mobile device 100, an application for reproducing multimedia content, etc. In an exemplary embodiment of the present invention, the program storage area stores an e-book reproducing program 153 for supporting the integration of files.

When the user selects an e-book 151 stored in the storage unit 150, the e-book reproducing program 153 reproduces the e-book 151 and displays text and images included in the e-book 151 on the display unit 140. During the display, the e-book reproducing program 153 also displays a screen when e-book auxiliary content 155 is reproduced. To do this, the e-book reproducing program 153 includes a routine for reproducing e-books, a routine for creating e-book auxiliary content, a sharing routine for transmitting or receiving e-book auxiliary content, etc.

The reproduction routine includes a number of subroutines: for example, for outputting a certain amount of text or images on the display unit 140, according to e-book format structures; for outputting screens when e-book auxiliary content 155 is reproduced, according to a user's selection; for outputting, when one of the items corresponding to e-book auxiliary content 155 in the list is selected, a sub-item included in the selected item or information linked to the selected item; and for outputting a map according to the reproduction of e-book auxiliary content 155. The map outputting subroutine may further include a number of subroutines: for example, for displaying particular words, entered before, related to a place name, on a map; for associating particular words with each other and displaying them accordingly as the displaying of the e-book 151 is developed on the map; for outputting information linked to the words displayed on respective maps; for outputting the linked information via audio signals; for outputting the linked information via a pop-up window; etc. The linked information may include: information regarding e-book content related to particular words displayed on the map; information showing the flow of marks on the map according to the development flow of a story in the e-book 151; audio information, image information or tag information related to a particular word, designated by the user; information related to a particular word, transmitted from the other mobile devices or a particular server; etc.

The creation routine includes a number of subroutines as follows. For example, when the user creates an input signal for selecting an item including a particular word, a phrase, a sentence or an image on the display unit 140 serving as a touch screen or via the input unit 120, while content of an e-book 151 is being output on the display unit 140, in association with the reproduction routine, one of the subroutines creates corresponding e-book auxiliary content 155 by associating the selected item with map information stored in the storage unit 150. When the user selects a corresponding item, another of the subroutines creates e-book auxiliary content 155, by linking, to an item, information stored in the storage unit 150 or transmitted from an external system.

The sharing routine includes a number of subroutines: for example, for transmitting e-book auxiliary content 155, created by the user, to a particular server or the other mobile devices; for receiving e-book auxiliary content 155 related to a particular e-book 151 from the other mobile devices or a particular server, according to the user's request; and for applying received e-book auxiliary content 155 to a corresponding e-book 151 and outputting it on a screen showing the e-book 151.

The data storage area stores data generated when the mobile device 100 is used, for example, a phone book, audio data, content, information corresponding to user data, etc. The data storage area also stores e-books 151. The e-books 151 may include e-book auxiliary content 155. For example, e-book auxiliary content 155 may be stored as part of a corresponding e-book 151. Alternatively, e-book auxiliary content 155 may be stored as an appendix of a corresponding e-book 151 in order to be reproduced in association with the e-book 151 and also in order to be transmitted or received. Therefore, when the mobile device 100 displays a list of e-books 151 on the display unit 140, it also displays: icons corresponding to preset images for the e-books 151; and identification marks indicating whether they have additionally created e-book auxiliary content 155, for example, images, color images, highlights, etc. The identification marks allow users to easily recognize that a corresponding e-book 151 has auxiliary content associated with it. The format of e-books 151 and file structures of e-book auxiliary content 155 will be described in detail later referring to FIGS. 3 and 4.

The controller 160 controls the operations of the mobile device 100 and the flow of signals among the components in the mobile device 100. The controller 160 also controls the processing of data in the mobile device 100. In an exemplary embodiment of the present invention, the controller 160 can support a reproduction function of e-books 151, and also reproduction, management and reception functions of e-book auxiliary content 155. This is described in detail referring to FIG. 2.

Figure 2:
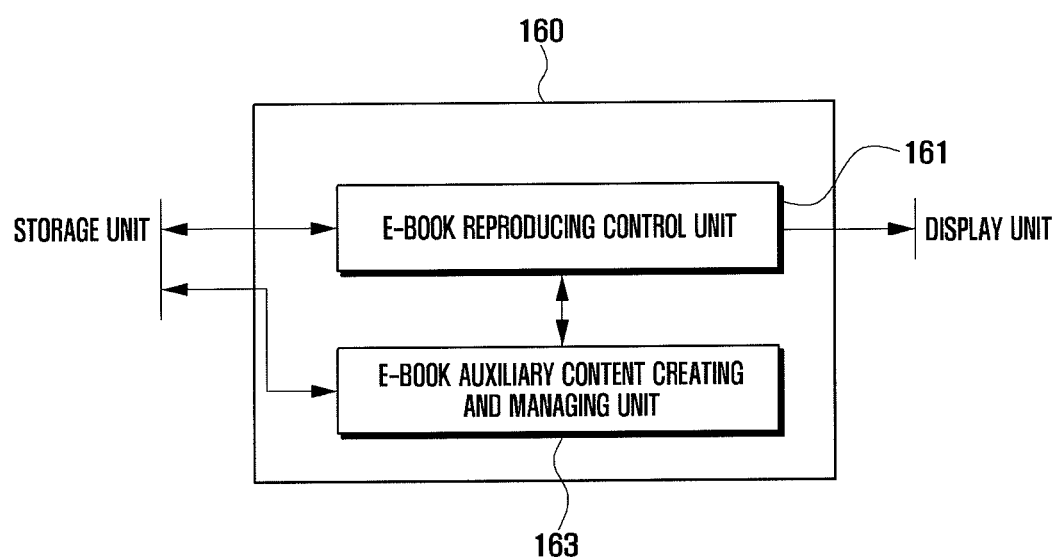
FIG. 2 illustrates a detailed view showing the controller of the mobile device shown in FIG. 1 according to an exemplary embodiment of the present invention.

FIG. 2 illustrates a detailed view showing a controller of the mobile device shown in FIG. 1 according to an exemplary embodiment of the present invention.

Referring to FIG. 2, a controller 160 includes an e-book reproducing control unit (e_RCU) 161 and an e-book auxiliary content creating and managing unit (eAUX_CMU) 163. The e_RCU 161 displays at least one e-book list, stored in the storage unit 150, on the display unit 140 according to an input signal created via the input unit 120. During this process, the e_RCU 161 may display, on the display unit 140, preset images for e-books in icon form. The e_RCU 161 may also display e-books with auxiliary content, which are distinguished from e-books without auxiliary content.

For example, the e_RCU 161 may output an image corresponding to auxiliary content for an e-book in an area adjacent to an icon related to the e-book. Alternatively, the e_RCU 161 may overlay and output at least part of the e-book auxiliary content on the icon of the e-book. When the user creates an input signal for selecting an e-book, the e_RCU 161 outputs, on the display unit 140, text or image information according to the format of the selected e-book. When the user creates an input signal for leafing through the pages of an e-book, for example, the e_RCU 161 may output a list of e-books or a list of items corresponding to e-book auxiliary content. Alternatively, when the user directly selects an icon corresponding to e-book auxiliary content, the e_RCU 161 may display text information included in e-book auxiliary content, image information including maps, etc., and a list of content items. In that case, the user is assisted to recall which e-book he/she opened, based on the e-book auxiliary content. When the user selects an e-book without auxiliary content, the e_RCU 161 may output, on the display unit 140, image or text information according to the format of the selected e-book.

The eAUX_CMU 163 creates e-book auxiliary content, according to a user's control, based on an e-book that is currently being reproduced, and manages the created e-book auxiliary content. The eAUX_CMU 163 can receive e-book auxiliary content related to a corresponding e-book from other mobile devices or a server, via the RF communication unit 110, according to a user's control, and can also store the received e-book auxiliary content, in association with the e-book. The e-book auxiliary content is created in such a manner that when the user selects text information and/or image information regarding an e-book that is currently reproduced, and the selected information is associated with a particular place name, the eAUX_CMU 163 makes a mark corresponding to the name place on a pre-stored map. In addition, e-book auxiliary content is also created in such a manner that the eAUX_CMU 163 links the e-book to the user's input tag information or image information or information regarding surrounding text that includes words in a page of the e-book. For example, when one of the pages, in an e-book reproduced in the mobile device 100, includes a word 'Paris,' and the user selects the word, the eAUX_CMU 163 can identify whether the user's selected word is related to a particular place name. When the eAUX_CMU 163 determines that the user's selected word is related to a particular place name, it loads a map from the storage unit 150 and marks the location corresponding to the place name on the map. During the display, the eAUX_CMU 163 displays information regarding a corresponding page of the e-book and a particular index, and registers the selected word as an item for the e-book auxiliary content. As such, the eAUX_CMU 163 allows the user to create e-book auxiliary content based on place names selected in a number of pages and a list of pages containing the selected words. The eAUX_CMU 163 allows the user to select at least one of a word, a phrase, a sentence, and an image, and to link the selected item to a particular image or tag information, and, to do this, to search information stored in the storage unit 150 or information acquired via a web server searching process for information related to the selected item, via a search engine. An example of the information related to the selected item is information regarding a photograph, an image or text for a level of economics, a population, a sightseeing resort, a historical site, indigenous products, etc., in a particular place. The eAUX_CMU 163 can also provide information regarding the other place names related to a particular name place, for example, place names adjacent to the particular name place. The eAUX_CMU 163 can display words related to the selected place name on the map, if they are needed in the development of a story of an e-book.

The eAUX_CMU 163 can transmit the created e-book auxiliary content to a particular server or other mobile devices according to the user's request. The e-book auxiliary content to be transmitted includes the unique information regarding the e-book, for example, bibliography information, thereby specifying which e-book it is related to. The eAUX_CMU 163 can search the other mobile devices or a server, via the RF communication unit 110, for e-book auxiliary content related to an e-book that is currently reproduced in the mobile device 100, according to the user's request. When the mobile device 100 receives the searched e-book auxiliary content from the external system, the eAUX_CMU 163 applies it to the e-book. When the e_RCU 161 reproduces an e-book with auxiliary content, the eAUX_ CMU 163 highlights items with information linked to the e-book auxiliary content or adds particular images to the items, thereby distinguishing between the items with information linked to the e-book auxiliary content from the other ones without linked information.

As described above, the mobile device 100 links words that the user selected while opening an e-book to visual information such as a map or additional information related to the selected words, thereby creating new e-book auxiliary content. This assists the user to recall the e-book later. In addition, the mobile device 100 can share the created e-book auxiliary content with other mobile devices, so that users can easily access e-books with the auxiliary content, for example, by opening visual information related to a corresponding e-book.

Figure 3:
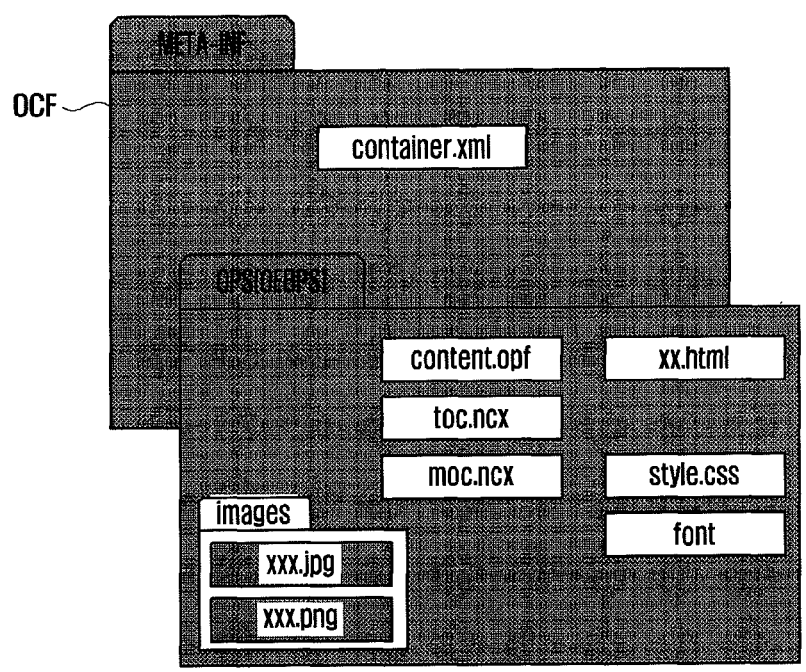
FIG. 3 illustrates a format of an e-book with auxiliary content according to an exemplary embodiment of the present invention.

FIG. 3 illustrates a format of an e-book containing auxiliary content according to an exemplary embodiment of the present invention.

Referring to FIG. 3, the format of an e-book 151 is a standard of electronic Publication (ePub) that includes three specifications: Open Container Format (OCF), Open Publication Structure (OPS), and Open Packaging Format (OPF).

The OCF specification represents a mimetype file, and appears first during the process of reproducing an e-book. OCF is stored in an uncompressed state. OCF includes META_INF/container.xml. The META_INF/container.xml file is a file that an e-book reader, i.e., the e-book reproducing control unit (e_RCU) 161, first refers to in order to reproduce an e-book. The META_INF/container.xml file contains information to specify the location of an OCF file.

The OPS specification specifies information to define the format of an e-book, for example, version, encoding information, type of content, title, etc.

The OPF specification is accompanied by files with the extensions .opf and .ncx. OPF houses content.opf, xx.html of information regarding text content of an e-book, style.css of information regarding the style of an e-book, font of the fonts of an e-book, toc.ncx (table of content navigation control file for XML) of information regarding a list of e-books, image information regarding an e-book, etc. In particular, OPF may contain moc.ncx (map of content) for e-book auxiliary content created by associating e-book content with a map. The content.opf file houses metadata, manifest, spine, and guide information. For example, the file for e-book auxiliary content, i.e., moc.ncx file, will be described as follows referring to FIG. 4.

Figure 4:
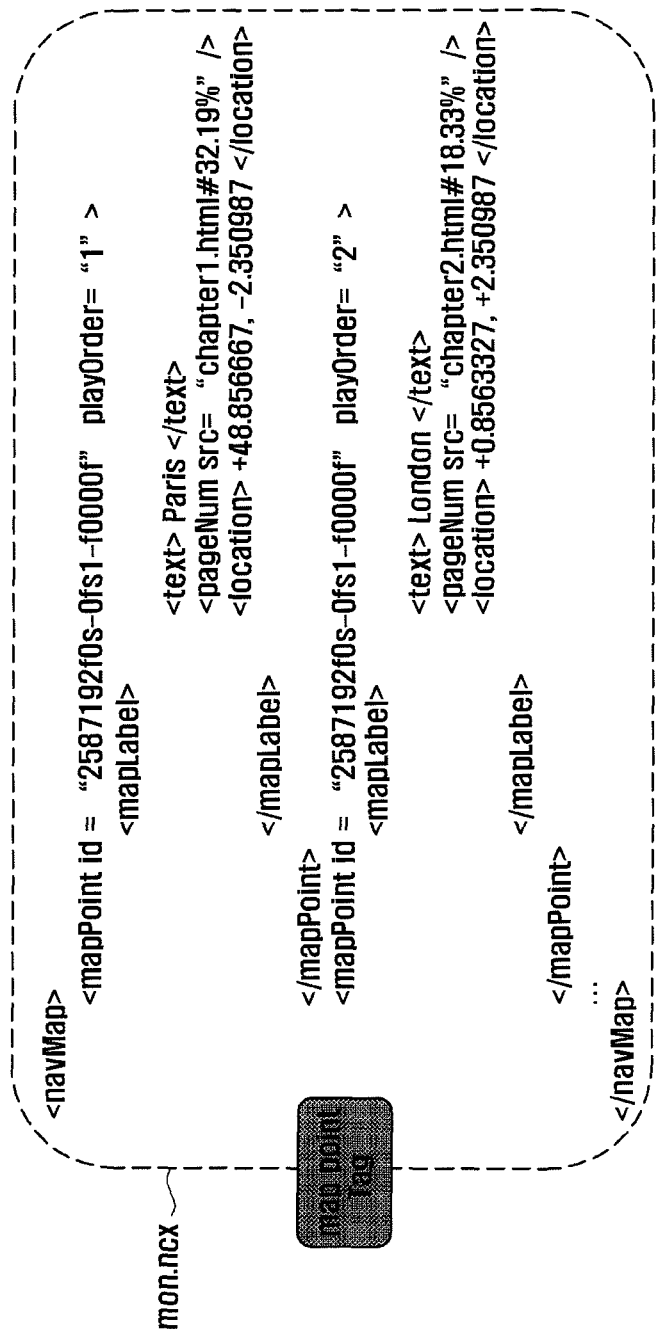
FIG. 4 illustrates a skeleton of a file for auxiliary content of an e-book, according to an exemplary embodiment of the present invention.

FIG. 4 shows a skeleton of mon.ncx file that includes Map Point Tag information according to an exemplary embodiment of the present invention. That is, e-book auxiliary content includes Map Point Tag comprised of MappointID and Maplabel. Maplabel may include, from text information of an e-book: a word that is related to a place name and selected by the user, e.g., 'Paris': information regarding pages (pageNum src) where corresponding words exist; and information regarding locations where a corresponding word is located. When the e_RCU 161 reproduces the e-book auxiliary content file, the mobile device 100 displays the screen on the display unit 140 as shown in FIG. 5.

Figure 5:
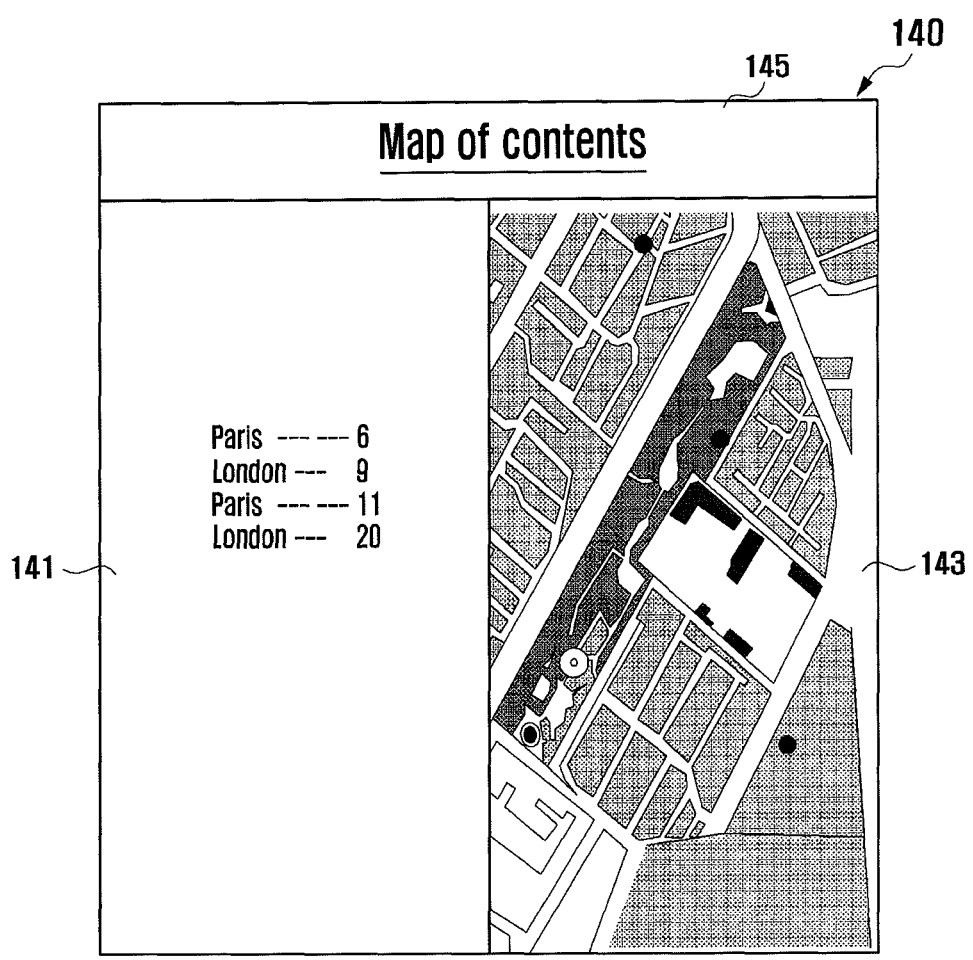
FIG. 5 illustrates a screen when e-book auxiliary content is reproduced in a mobile device according to an exemplary embodiment of the present invention.

FIG. 5 illustrates a screen of a display unit when e-book auxiliary content is reproduced in the mobile device according to an exemplary embodiment of the present invention.

Referring to FIG. 5, when the e-book auxiliary content 155 is reproduced, the screen of display unit 140 shows an area 145 displaying the title of the e-book auxiliary content 155, an area 141 displaying a content item, and an area 143 displaying a map.

The content item displaying area 141 refers to an area on which a list of items included in the e-book auxiliary content 155 is displayed. For example, on the content item displaying area 141 are displayed a word corresponding to a place name that the user selects from the e-book 151, and the page number associated with the page containing the user's selected word. As shown in FIG. 5, on the content item displaying area 141 the e-book auxiliary content 155 is displayed that includes 'Paris' on page 6, 'London' on page 9, 'Paris' on page 11, and 'London' on page 20 in the e-book 151. When a number of words are selected in one page, on the content item displaying area 141 are displayed by the e-book auxiliary content 155, as one item by associating the selected words with each other, during the reproduction. For example, when the user selects 'Paris' and 'London' on page 7, 'Paris, London—7' may be displayed on the content item displaying area 141. The user can select respective items on the content item displaying area 141. When the user selects one of the items, the display unit 140 displays a screen showing a corresponding page, further highlighting corresponding words on the page.

The map displaying area 143 refers to an area on which map information is displayed that is related to place names displayed on the content item displaying area 141. For example, the map displaying area 143 may display maps (not shown) containing place names 'Paris' and 'London' displayed on the content item displaying area 141, separately, on a reduced scale. Alternatively, on the map displaying area 143 a map is displayed, and place names 'Paris' and 'London' are displayed on the content item displaying area 141, on a reduced scale.

Figure 6:
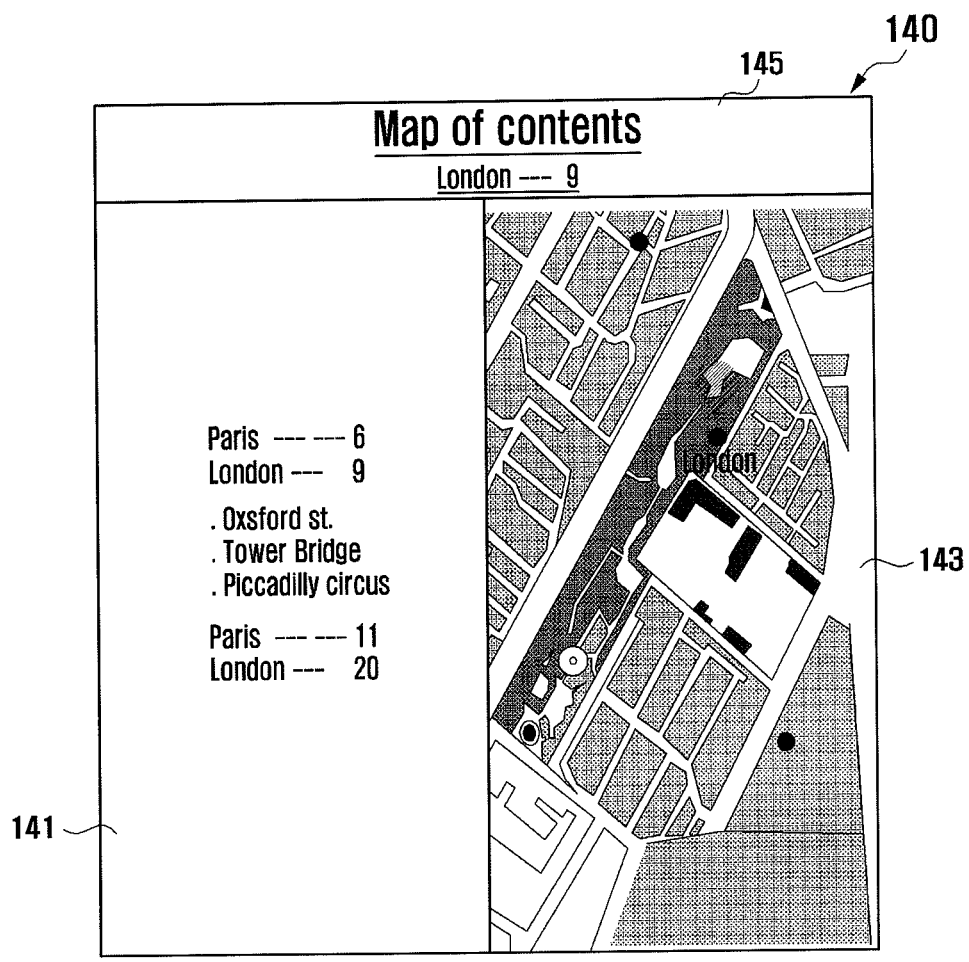
FIG. 6 illustrates a screen when e-book auxiliary content is operated in a mobile device according to an exemplary embodiment of the present invention.

When the user selects one of the items on the content item displaying area 141, for example, 'London—9,' the e_RCU 161 controls the reproduction of the e-book auxiliary content and displays a screen on the display unit 140 as shown in FIG. 6.

FIG. 6 illustrates a screen when e-book auxiliary content is operated in a mobile device according to an exemplary embodiment of the present invention.

Referring to FIG. 6, the e_RCU 161 displays, on the display unit 140, a screen that includes the title displaying area 145, the content item displaying area 141, and the map displaying area 143. When the user selects one of the items on the content item displaying area 141, the e_RCU 161 displays the selected item in title displaying area 145 and displays sub-items linked to the selected item. However, when the user's selected item does not include any sub-items, the e_RCU 161 keeps displaying the previous screen or outputs a pop-up message stating that it has no sub-item.

When the user selects an item with sub-items, e.g., 'London—9,' the e_RCU 161 may display the sub-items, e.g., 'Oxford st' 'Tower Bridge,' and 'Piccadilly circus.' In order to display the sub-items, the e_RCU 161 secures space between the main items and the selected item, and then outputs the sub-items to the space. Alternatively, the e_RCU 161 may also overlay and display sub-items on main items.

When the user selects one of the sub-items displayed on the display unit 140, the e_RCU 161 may output information linked to the selected sub-item, e.g., text information, image information, photograph/video information, audio information, etc. The linked information may be created from information that is stored in the storage unit 150 or downloaded from a web server when the user creates the e-book auxiliary content 155. The items displayed on the content item displaying area 141 are linked to different information during the creation of e-book auxiliary content 155. Therefore, although the items specify the same place name, they may have different sub-items. When the user selects a main item without sub-items, the e_RCU 161 may output sub-items linked to other instances of the same word under a certain condition. For example, when the user selects a main item without sub-items, the e_RCU 161 outputs sub-items of the same word with the largest number of sub-items. This function may be disabled according to a user's settings. In that case, the e_RCU 161 may perform an operation indicating a state where there is no sub-item of the selected item.

Figure 7:
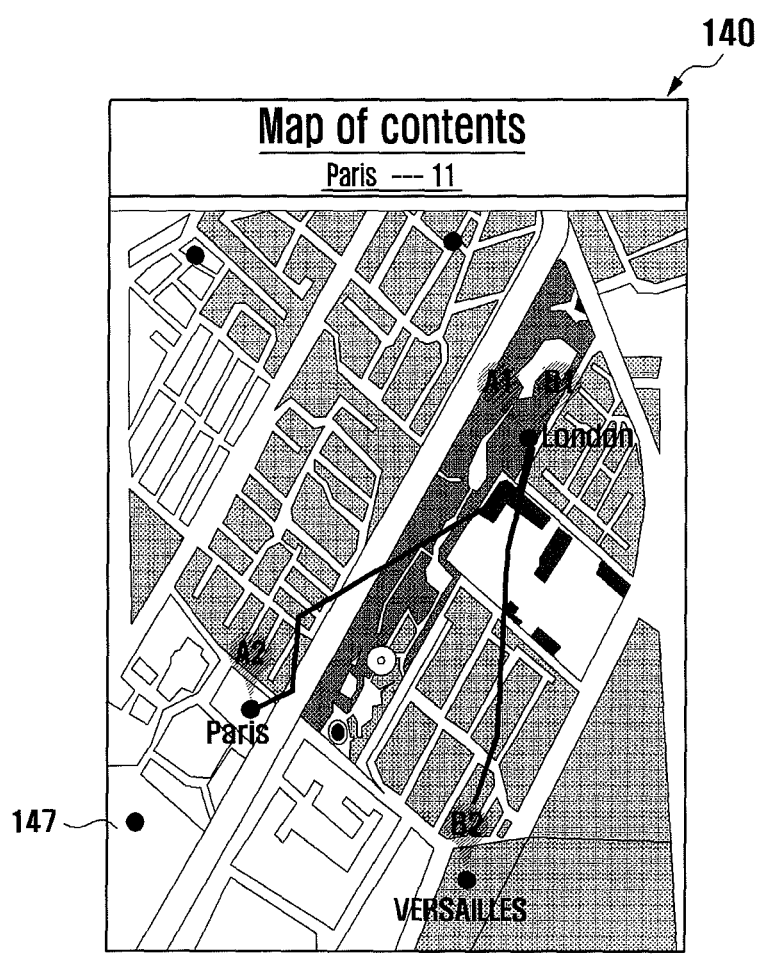
FIG. 7 illustrates a screen when e-book auxiliary content is operated in a mobile device according to another exemplary embodiment of the present invention.

When a particular item in the content item displaying area 141 is selected according to a user's settings or a mobile device 100 manufacturer's design, the e_RCU 161 displays a detailed map information area 147 on the display unit 140 as shown in FIG. 7.

FIG. 7 illustrates a screen when e-book auxiliary content is operated in a mobile device according to another exemplary embodiment of the present invention.

Referring to FIG. 7, when the user selects the third item 'Paris—11' on the content item displaying area 141 on the screen where the e-book auxiliary content 155 is reproduced as shown in FIG. 5, the e_RCU 161 displays, on a detailed map information area 147, the development of a story flow from pages included in the previous items to a corresponding page. For example, the story of an e-book 151 flows in such a manner that hero 'A' is first located at a first place 'A1'; hero 'B' first meets hero 'A' at a first place 'B1,' e.g., London; hero 'B' moves to Versailles according to the development of the story on page 11; and hero 'A' moves to a third place 'A2.' The e_RCU 161 may display the movement track of a corresponding hero on the detailed map information area 147. To do this, the eAUX_CMU 163 filters information included in the e-book 151, and classifies proper nouns, such as names, etc., that occur a minimum number of times or with a minimum frequency, into at least one hero. After that, the eAUX_CMU 163 filters place names written in the paragraph or page on which respective heroes' names appear, and then connects corresponding heroes to the place names. These processes output the movement track of the heroes on the detailed map information area 147.

As described above, the mobile device 100 allows the user to create and manage auxiliary content for e-books, so that he/she can easily recall information later, acquired when he/she opens the e-book.

Figure 8:
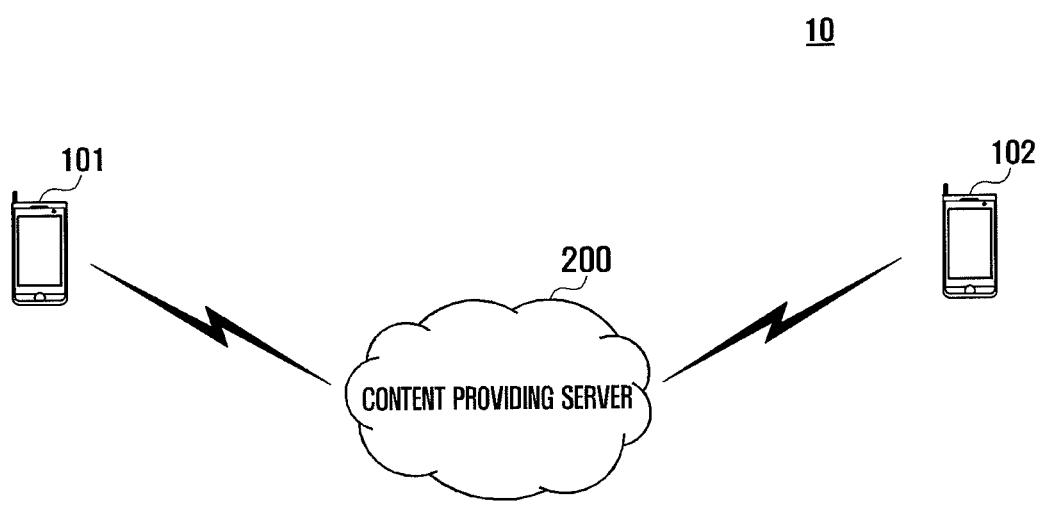
FIG. 8 illustrates a view showing a configuration of a system for sharing e-book auxiliary content according to an exemplary embodiment of the present invention.
Figure 9:
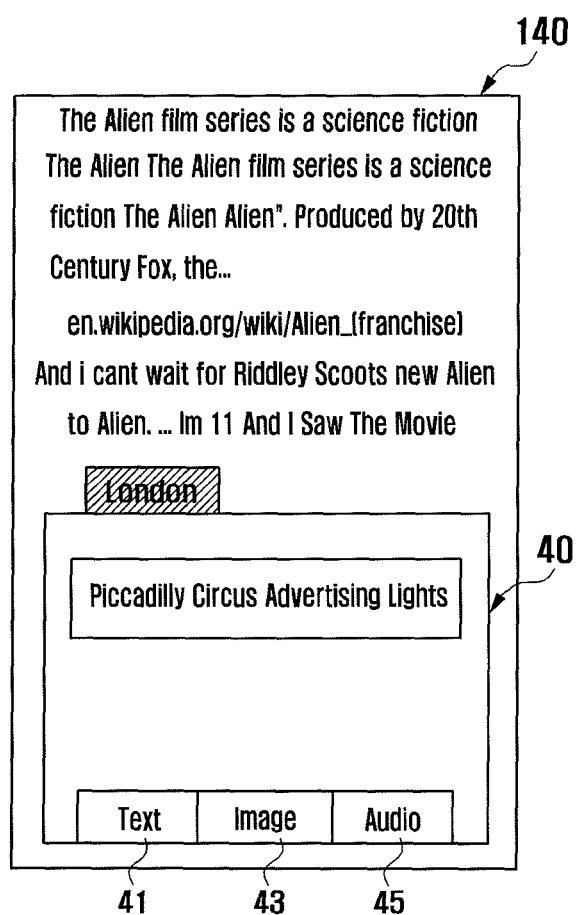
FIG. 9 illustrates a screen using a method for operating an e-book, according to an exemplary embodiment of the present invention.
Figure 10:
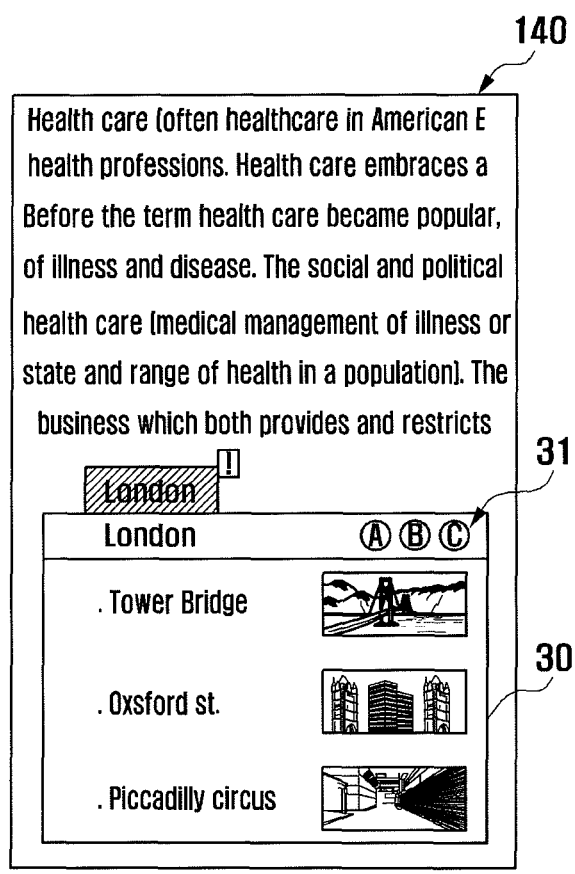
FIG. 10 illustrates a screen using a method for operating an e-book by sharing e-book auxiliary content, according to an exemplary embodiment of the present invention.

The following description is provided regarding a system for supporting an e-book application service to share e-book auxiliary content between the mobile device and other external devices, referring to FIGS. 8 to 10.

FIG. 8 illustrates a view showing a configuration of a system for sharing e-book auxiliary content according to an exemplary embodiment of the present invention. FIG. 9 illustrates a screen to describe a process for creating e-book auxiliary content. FIG. 10 illustrates a screen to describe a process for downloading e-book auxiliary content from a content providing server and applying it to a corresponding e-book.

Referring to FIG. 8, the e-book auxiliary content sharing system 10 includes a first mobile device 101, a second mobile device 102, and a content providing server 200. The e-book auxiliary content sharing system 10 may further include communication networks between the mobile devices 101 and 102 and the content providing server 200, so that they can transmit and receive signals there between.

The e-book auxiliary content sharing system 10 is operated in such a manner that, when the first mobile device 101 creates e-book auxiliary content 155 and provides it to the content providing server 200, the second mobile device 102 searches the server 200 for the e-book auxiliary content 155 and downloads it therefrom, so that the user of the second mobile device 102 can view the e-book auxiliary content 155 when opening a corresponding e-book 151.

In an exemplary embodiment of the present invention, the first mobile device 101 has a same configuration as the mobile device 100 as shown in FIGS. 1 to 7. Therefore, the first mobile device 101 can reproduce an e-book 151 selected by the user from the storage unit 150, and simultaneously allow the user to create e-book auxiliary content 155. To this end, as shown in FIG. 9, the user can control the first mobile device 101 to reproduce and open an e-book 151, and can select a particular word on a page, e.g., 'London.' In that case, when the user's selected item is a place name, the eAUX_CMU 163 displays an e-book auxiliary content writing screen 40 so that the user can create e-book auxiliary content 155 based on the selected word.

Referring to FIG. 9, the e-book auxiliary content writing screen 40 includes a first area where a word is selected and an area adjacent to the first area showing the selected word. The e-book auxiliary content writing screen 40 may also include windows for inputting information, e.g., text, images, audio files, etc. For example, when the user intends to input text information regarding a word, he/she selects a text tab 41 from tabs arranged at the bottom in the e-book auxiliary content writing screen 40 and then inputs text information via the input unit 120, etc., or receives text information copied from other documents. Likewise, the user can select an image tab 43, search for an image stored in the storage unit 150 or received via the RF communication unit 110 from the external system, link the searched image to a selected word, and then store the e-book auxiliary content 155 in the storage unit 150. In addition, the user can also select an audio tab 45, search for an audio file stored in the storage unit 150 or received via the RF communication unit 110 from the external system, link the audio file to a corresponding word, and then store the e-book auxiliary content 155 in the storage unit 150.

The first mobile device 101 creates e-book auxiliary content 155 with respect to a particular word and then transmits it to the content providing server 200. To this end, the first mobile device 101 provides a screen for uploading e-book auxiliary content 155 on the display unit. When the user of the first mobile device 101 operates to upload e-book auxiliary content 155 for an e-book 151 on the screen, the first mobile device 101 transmits the bibliography information regarding the e-book 151 and the e-book auxiliary content 155 to the content providing server 200. The e-book auxiliary content 155 transmitted to the content providing server 200 may be auxiliary content linked to only a particular word in a page of the e-book 151 or the entire e-book auxiliary content 155 included in the e-book 151.

The second mobile device 102 receives e-book auxiliary content 155 from the content providing server 200 and applies it to a corresponding e-book 151 stored therein, so that it does not need to create e-book auxiliary content 155 for the e-book 151. The second mobile device 102 can apply e-book auxiliary content 155, created by and transmitted from other mobile devices or the content providing server 200, to its copy of e-book 151, so that the user of the second mobile device 102 can open the received e-book auxiliary content 155 together with the e-book 151. When the user turns on the second mobile device 102 and opens an e-book 151 stored in the storage unit 150, the e-book reproducing control unit (e_RCU) determines whether the copy of the e-book 151 on the second mobile device 102 includes e-book auxiliary content 155. When the e_RCU determines that the copy of the e-book 151 on the second mobile device 102 does not have e-book auxiliary content 155, it outputs a pop-up message asking whether the user wants to download the e-book auxiliary content 155 from the content providing server 200. To this end, the second mobile device 102 displays an additional key or a key map icon for downloading e-book auxiliary content 155 on the display unit 140. When the user operates the key or key icon, the second mobile device 102 displays, on the display unit 140, a screen for downloading e-book auxiliary content 155 related to the user's selected e-book 151 from the content providing server 200. The second mobile device 102 establishes a communication channel with the content providing server 200, so that the user can search for e-book auxiliary content 155 related to a particular page of the e-book 151 or to the entire e-book 151. The second mobile device 102 also transmits information to search for a user's requested e-book auxiliary content 155 to the content providing server 200. When the user inputs a page number or creates an input signal for requesting e-book auxiliary content 155 in a state where the e-book 151 is selected, the second mobile device 102 transmits, to the content providing server 200, the page number and the bibliography information regarding the e-book 151 or information for requesting the e-book auxiliary content 155. In that case, the content providing server 200 searches for e-book auxiliary content 155 related to the e-book 151 based on the received bibliography information, and transmits the search information to the second mobile device 102. When the user inputs to the second mobile device 102 a signal for receiving the e-book auxiliary content 155 from the content providing server 200, the second mobile device 102 receives the e-book auxiliary content 155 from the server 200 via the RF communication unit 110. The second mobile device 102 stores the received e-book auxiliary content 155 in the storage unit 150. Alternatively, the second mobile device 102 applies the received e-book auxiliary content 155 to the e-book 151 and then stores it in the storage unit 150. During this process, the second mobile device 102 determines whether the e-book 151 has other previously linked e-book auxiliary content 155. When the second mobile device 102 determines that the e-book 151 has other previously linked e-book auxiliary content 155, it outputs a pop-up message asking the user whether to delete the previously linked e-book auxiliary content 155 from the storage unit 150, to write the newly received e-book auxiliary content 155 over the previously linked e-book auxiliary content 155, to integrate the newly received e-book auxiliary content 155 with the previously linked e-book auxiliary content 155. According to the user's selection, the second mobile device 102 applies the received e-book auxiliary content 155 to the e-book 151. After that, as shown in FIG. 10, when the user selects a particular word linked to the e-book auxiliary content 155, the second mobile device 102 displays the e-book auxiliary content 155 on the display unit.

Referring to FIG. 10, the second mobile device 102 displays on display unit 140 an e-book auxiliary content display screen 30 that shows various types of sub-items related to the user's selected word. The sub-items are displayed as images related to the word in the thumbnail form. The second mobile device 102 can display an area 31 for showing indexes so that the user can easily filter only corresponding information that he/she wants from the e-book auxiliary content 155. The indexes displayed on the index area 31 may serve as keys for switching screens there between; for example, outputting sub-items according to the user's selection, outputting only image screens, outputting additional information, etc.

The content providing server 200 receives e-book auxiliary content 155 and bibliography information regarding e-books 151 from the first mobile device 101, and creates a database. When the content providing server 200 receives information from the second mobile device 102 requesting a corresponding e-book auxiliary content 155, it searches for the e-book auxiliary content 155 based on the bibliography information and transmits the searched information and the searched e-book auxiliary content 155 to the second mobile device 102.

As described above, the e-book auxiliary content sharing system can allow a number of mobile devices to share their created e-book auxiliary content 155 for e-books 151 with each other via the database of a content providing server 200, so that the respective e-books 151 can augment their available information. In addition, the mobile device users can easily search for information while opening a corresponding e-book 151.

Figure 11:
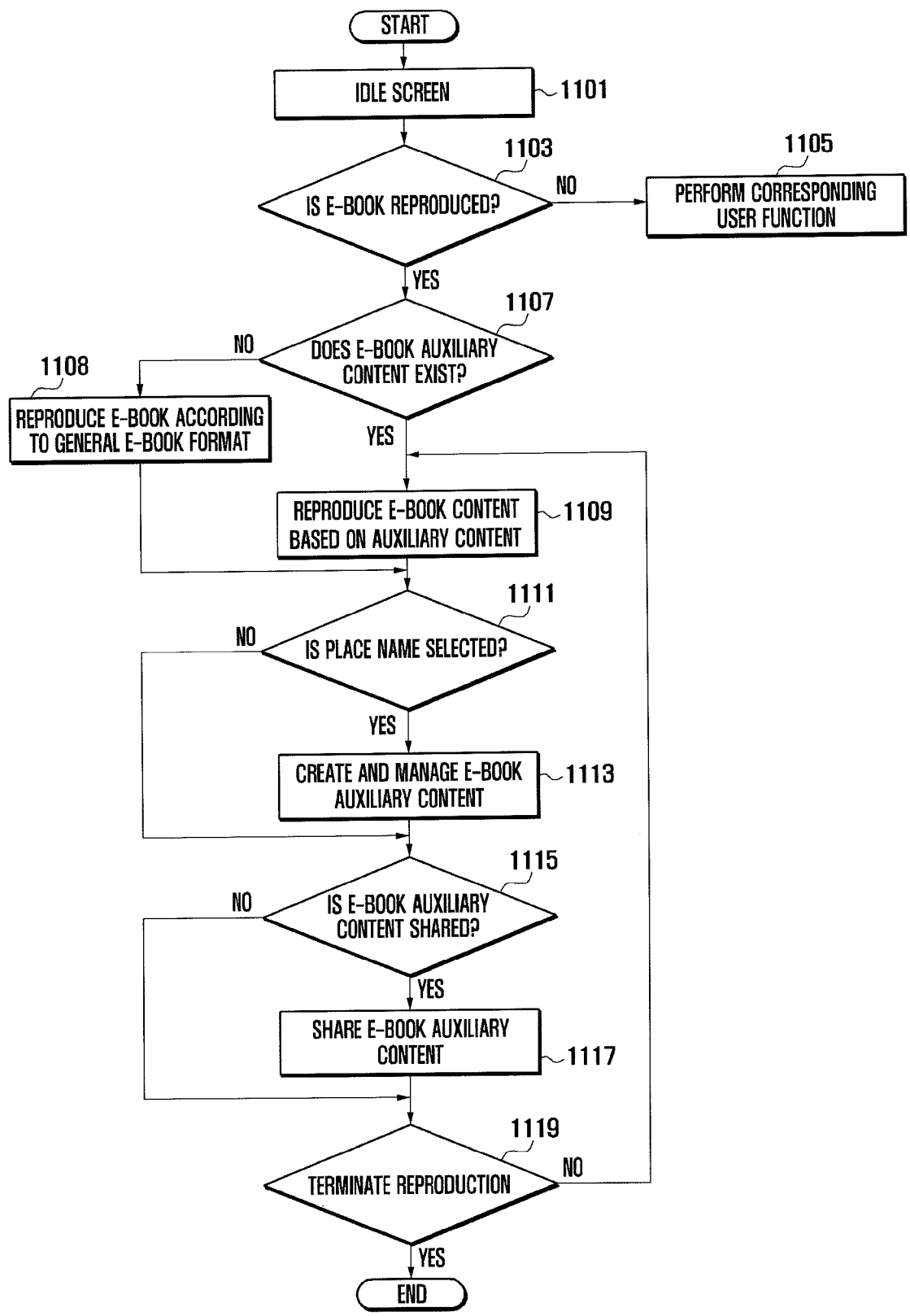
FIG. 11 illustrates a flow chart that describes a method for operating e-book auxiliary content according to an exemplary embodiment of the present invention.

FIG. 11 illustrates a flow chart that describes a method for supporting an e-book application service according to an exemplary embodiment of the present invention.

Referring to FIG. 11, when the mobile device 100 is turned on, the controller 160 initializes the components. After that, the controller 160 displays an idle screen on the display unit 140 according to a preset schedule at step 1101.

The controller 160 determines whether an input signal for reproducing an e-book 151 occurs at step 1103. When the controller 160 determines that a created input signal is not an input signal for reproducing an e-book at step 1103, it performs a corresponding function, e.g., a call function, a file search function, a file reproducing function, a web access function, etc., at step 1105.

On the contrary, when the controller 160 determines that an input signal for reproducing an e-book 151 occurs at step 1103, it displays a list of e-books 151 stored in the storage unit 150 on the display unit 140. During this process, the controller 160 outputs icons containing images related to the e-books 151 on the display unit 140. In particular, the controller 160 can display the icons for e-books 151 with e-book auxiliary content 155, differently from e-books 151 without e-book auxiliary content 155, for example, by adding an additional image or an additional icon to the icons for the e-book 151 with e-book auxiliary content 155 or by displaying the icons in different colors. When the controller 160 receives an input signal for selecting an e-book 151, it determines whether the selected e-book 151 has an e-book auxiliary content 155 at step 1107. When the controller 160 determines that the selected e-book 151 has no e-book auxiliary content 155 at step 1107, it reproduces the selected e-book 151 according to the general standard of the e-book 151 at step 1108. For example, when the controller 160 detects a user's input signal for reproducing an e-book 151 without e-book auxiliary content 155, the controller controls to display a list output screen, a text output screen, an image output screen, etc., on the display unit 140 according to a format of the e-book 151 and the user's input signal.

On the contrary, when the controller 160 detects an input signal for reproducing the selected e-book 151 with e-book auxiliary content 155 at step 1107, it reproduces and displays the selected e-book 151, by applying the e-book auxiliary content 155 to the reproduced e-book 151 at step 1109. For example, the controller 160 can display, on the display unit 140, a list output screen, a screen for showing a list of e-book auxiliary content 155, a text output screen for showing words to which e-book auxiliary content 155 is applied, an image output screen for showing images to which e-book auxiliary content 155 is applied, etc.

After that, the controller 160 determines whether the user selects a word related to a place name at step 1111. When the controller 160 determines that the user selects a word related to a place name at step at step 1111, it can support the creation of e-book auxiliary content 155 related to the place name at step 1113. More specifically, the controller 160 can create information to mark, on a map, a location corresponding to the place name, based on the place name and the current page number of the e-book. When words related to place names are selected from the previous page and words related to place names are selected from the next page according to the development of a story in an e-book 151, the controller 160 determines locations of the words related to place names on the page, and creates information for displaying a route on the map, thereby creating e-book auxiliary content 155 related to the user's selected word. When the user creates an input signal for linking particular information, e.g., tag information, image or audio information, etc., to the user's selected word, the controller 160 may display an e-book auxiliary content writing screen 40 for performing an information associating process. Meanwhile, when the controller 160 determines that the user does not select a word related to a place name at step 1111, the process proceeds to step 1115.

After creating e-book auxiliary content 155 at step 1113, the controller 160 determines whether an input signal for sharing the e-book auxiliary content 155 is created at step 1115. When the controller 160 determines that an input signal for sharing the e-book auxiliary content 155 is created at step 1115, it performs a corresponding process for sharing the e-book auxiliary content 155 at step 1117. More specifically, when an input signal for uploading the e-book auxiliary content 155 is created, the controller 160 controls the RF communication unit 110 to establish a communication channel with a content providing server 200. After that, according to the user's request, the controller 160 transmits to the content providing server 200 at least part of the e-book auxiliary content 155 related to the e-book 151, e.g., e-book auxiliary content 155 created via part of pages or the entire page of the e-book 151, and bibliography information regarding the e-book 151. The bibliography information may be unique identification information of the e-book 151 according to standard, which is used to distinguish from the other e-books 151.

When an input signal for downloading e-book auxiliary content 155 related to a currently reproduced e-book 151 is created, the controller 160 establishes a communication channel with the content providing server 200 and then transmits bibliography information regarding the e-book 151 thereto. The controller 160 receives a list of e-book auxiliary content 155 related to the e-book 151 with the bibliography information from the content providing server 200. When the user selects a corresponding e-book auxiliary content 155 from the list, the controller 160 downloads the selected e-book auxiliary content 155 from the content providing server 200 and applies it to the e-book 151. The process of applying the downloaded e-book auxiliary content 155 to a corresponding e-book 151 may include at least one of the processes for linking information to words on respective pages, based on page information and word information included in the downloaded e-book auxiliary content 155, and for applying map information created via page information and word information to a corresponding e-book 151. Meanwhile, when the controller 160 determines that an input signal for sharing the e-book auxiliary content 155 is not created at step 1115, the process proceeds to step 1119.

After that, the controller 160 determines whether an input signal for terminating the reproduction of e-book 151 is created at step 1119. When the controller 160 determines that an input signal for terminating the reproduction of e-book 151 is not created at step 1119, it returns to and proceeds with step 1109.

Although the exemplary embodiment described above is implemented in such a manner that when a word related to a particular place name in the e-book 151 is selected, e-book auxiliary content 155 related to the selected word is output; or when a user's selected word is determined not to be linked to e-book auxiliary content 155, corresponding e-book auxiliary content 155 is created, it should be understood that the present invention is not limited to the exemplary embodiments. For example, the exemplary embodiments may be modified in such a manner that, when a user selects at least one item in an e-book 151, such as a word, a phrase, a sentence, an image, etc., it creates or outputs e-book auxiliary content 155 related to the selected item.

E-book auxiliary content 155 according to exemplary embodiments of the present invention includes tag information regarding text or images linked to a word, a phrase, a sentence, an image, etc., in an e-book 151. Tag information includes, for example, information regarding a map on which a word related to a place name in an e-book 151 is displayed, and connection information regarding a route connecting between words selected with respect to pages on a map in order to display the development of a story of the e-book 151 via the map information.

As described above, according to the e-book application service supporting system and method and the mobile device 100 adapted to the method, new e-book auxiliary content 155 can be created when an e-book 151 is open, so that the content can assist the user to recall and more fully enjoy the e-book 151. In addition, since the created content can be shared, additional information related to the e-book 151 is also operated in the e-book application service supporting system and mobile device 100 adapted to the method.

As described above, the system and method for supporting an e-book application service and the mobile device 100 adapted to the method, according to exemplary embodiments of the present invention, can provide e-book auxiliary content 155 that shows relationships between a user's selected words on a map with respect to pages, so that the user can easily recognize the development of a story in the e-book 151. According to exemplary embodiments of the present invention, the e-book auxiliary content 155 includes information linked to a user's selected item in an e-book 151. In addition, exemplary embodiments of the present invention allow the mobile device user to share the e-book auxiliary content 155 with other users who open the same e-book 151 based on the unique information regarding the e-book 151.

Although it is not shown in the drawings, the mobile device 100 may selectively further include various types of components, for example: a short-range communication module for short-range communication; an interface for transmitting/receiving data in a wireless or weird mode; an Internet communication module; and a digital broadcast module for receiving and reproducing broadcasts. With the spread of digital convergence, although mobile devices 100 are too various to list their modifications in this description, it will be easily appreciated by those skilled in the art that other components equivalent to the above-listed components may be further included to the mobile device 100 according to exemplary embodiments of the present invention. Also, it will be appreciated that, according to the purposes, the mobile device 100 may also be implemented by omitting a particular component or replacing it with other components.

The mobile device 100 according to exemplary embodiments of the present invention can be applied to various types of electronic devices if they can reproduce e-books 151 with e-book auxiliary content 155. The mobile device 100 according to exemplary embodiments of the present invention includes all information communication devices, multimedia devices, and their applications, which are operated according to communication protocols corresponding to a variety of communication systems. For example, the mobile device 100 can be applied to mobile communication terminals, Portable Multimedia Players (PMPs), digital broadcast players, Personal Digital Assistants (PDAs), audio players (e.g., MP3 players), mobile game players, smartphones, laptop computers, handheld Personal Computers (PC), etc.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for supporting an electronic book (e-book) application service, the method comprising:
reproducing the e-book stored in a memory;
creating, when a number of words related to place names are selected in the e-book, e-book auxiliary content that includes information regarding a map to which information regarding routes between place locations corresponding to the selected words is applied, with respect to at least one page containing the selected words; and
storing the e-book with the created e-book auxiliary content in the memory,
wherein in response, when a user selects a predetermined item in a content items displaying area of a screen where the e-book auxiliary content is reproduced, at least one processor displays on a detailed map information area, information regarding routes including development of a story flow from pages included in previous items to a corresponding page.

2. The method of claim 1, further comprising:
displaying a list of e-books,
wherein the displaying of the list of e-books comprises:
determining whether the e-books have associated auxiliary content; and displaying, when it is determined that the e-books have auxiliary content, identification marks indicating that the e-books have auxiliary content.

3. The method of claim 1, wherein the reproducing of the stored e-book comprises:
outputting, when the e-book has e-book auxiliary content, a list output screen showing pages and words, serving as items, included in the e-book auxiliary content, according to a user's inputs; and
outputting a text output screen where the words to which the e-book auxiliary content are applied are displayed differently from other words located on a same page of the e-book.

4. The method of claim 3, wherein the outputting of the list output screen comprises:
outputting, when a particular item comprising at least one word and page is selected on the list output screen, sub-items included in the selected item; and
outputting, when a particular item comprising the at least one word and page is selected, information regarding a map that displays information regarding a route connecting a place location corresponding to a word, selected on a previous page, to a place location corresponding to the currently selected word on the currently selected page.

5. The method of claim 1, wherein the creating of the e-book auxiliary content comprises:
selecting an item that includes at least one of a particular word, a phrase, a sentence, or an image, from the e-book content; and
linking at least one of text information, image information, or audio information, to the selected item.

6. The method of claim 5, further comprising:
displaying, when an item to which the e-book auxiliary content is applied is selected, the information regarding the linking of at least one of the text information, image information, or audio information to the selected item.

7. The method of claim 1, further comprising:
uploading the created e-book auxiliary content and unique identifying information regarding the corresponding e-book to a content providing server; and
downloading at least one auxiliary content from the content providing server, based on unique identifying information of an e-book.

8. A mobile device comprising:
at least one processor configured to create, when a number of words related to place names are selected in a reproduced electronic book (e-book), e-book auxiliary content that includes information regarding a map to which information regarding routes between place locations corresponding to the selected words is applied, with respect to at least one page containing the selected words; and
a memory configured to store the e-book with the created e-book auxiliary content,
wherein in response, when a user selects a predetermined item in a content items displaying area of a screen where the e-book auxiliary content is reproduced, the at least one processor is further configured to display on a detailed map information area, information regarding routes including development of a story flow from pages included in previous items to a corresponding page.

9. The mobile device of claim 8, further comprising:
a display configured to display a list of e-books.

10. The mobile device of claim 9, wherein the display is further configured to output, when displaying the list of e-books with e-book auxiliary content, identification marks indicating e-books that have auxiliary content.

11. The mobile device of claim 9, wherein the display is further configured to output at least one of:
a list output screen, when the e-book has e-book auxiliary content, for showing pages and words, serving as items, included in the e-book auxiliary content, according to a user's inputs; or
a text output screen where the words to which the e-book auxiliary content are applied are displayed differently from other words on a same page of the e-book.

12. The mobile device of claim 11, wherein, when a particular item comprising at least one word and page is selected on the list output screen, the display is further configured to output at least one of:
sub-items included in the selected item; or
information regarding a map that displays information regarding a route connecting a place location corresponding to a word, selected on a previous page, to a place location corresponding to the currently selected word on the currently selected page.

13. The mobile device of claim 8, further comprising:
a touch screen,
wherein the touch screen is configured to receive an input signal for selecting an item that includes at least one of a particular word, a phrase, a sentence, or an image from the e-book content, and
wherein the at least one processor is further configured to link at least one of text information, image information, or audio information, to the selected item.

14. The mobile device of claim 12, wherein the display is further configured to display, when an item to which the e-book auxiliary content is applied is selected, a screen showing the information regarding the linking of at least one of the text information, the image information, or the audio information, to the selected item.

15. The mobile device of claim 8, further comprising:
a radio frequency (RF) transceiver configured to:
transmit the created e-book auxiliary content and unique identifying information regarding the corresponding e-book to a content providing server, or
download at least one e-book auxiliary content from the content providing server, based on unique identifying e-book information.

16. A system for supporting an electronic book (e-book) application service, the system comprising:
at least one mobile device configured to:
create, when a number of words related to place names are selected in a reproduced e-book, e-book auxiliary content that includes information regarding a map to which information regarding routes between place locations corresponding to the selected words is applied, with respect to at least one page containing the selected words, and
store the e-book that includes the e-book auxiliary content; and
a content providing server configured to:
receive and store the e-book auxiliary content transmitted from the mobile device, or
provide stored e-book auxiliary content to the mobile device,
wherein in response, when a user selects a predetermined item in a content items displaying area of a screen where the e-book auxiliary content is reproduced, at least one processor is configured to display on a detailed map information area, information regarding routes including development of a story flow from pages included in previous items to a corresponding page.

17. The system of claim 16, wherein the mobile device further comprises a display, wherein the display is configured to:
- output, when displaying a list of e-books with auxiliary content, identification marks indicating e-books that have auxiliary content, and
- output at least one of a list output screen or a text output screen, wherein the list output screen shows, when the e-book has e-book auxiliary content, pages and words, serving as items, included in the e-book auxiliary content, according to a user's inputs, and wherein the text output screen shows the words to which the e-book auxiliary content are applied, displayed differently from other words on a same page of the e-book.

18. The system of claim 17, wherein, when a particular item comprising the word and page is selected on the list output screen, the display is further configured to output at least one of:
- sub-items included in the selected item; or
- information regarding a map that displays information regarding a route connecting a place location corresponding to a word, selected on a previous page, to a place location corresponding to the currently selected word on the currently selected page.

19. The system of claim 16, wherein the mobile device further comprises:
- a touch screen configured to receive a selection of an item that includes at least one of a particular word, a phrase, a sentence, or an image, from the e-book content; and
- a memory configured to:
  - link at least one of text information, image information, or audio information, to the selected item, and
  - store the at least one of text information, image information, or audio information.

20. The system of claim 19, wherein the display is further configured to display, when an item to which the e-book auxiliary content is applied is selected, a screen showing the information regarding the linking of at least one of the text information, the image information, or the audio information, to the selected item.

* * * * *